United States Patent [19]
Woltering

[11] Patent Number: 5,123,292
[45] Date of Patent: Jun. 23, 1992

[54] MOTIVATIONAL GENERATOR

[76] Inventor: Howard M. Woltering, Rte. 2 Box 454, Foster, Ky. 41043

[21] Appl. No.: 636,095

[22] Filed: Dec. 31, 1990

[51] Int. Cl.⁵ ............................................. F16H 33/10
[52] U.S. Cl. ............................................. 74/87; 74/61
[58] Field of Search ................ 74/91, 87, 84 S; 209/367; 366/128

[56] References Cited

U.S. PATENT DOCUMENTS

| | | | |
|---|---|---|---|
| 2,206,386 | 7/1940 | Bernhard | 74/61 |
| 2,730,237 | 1/1956 | Linke | 209/366.5 |
| 3,220,268 | 11/1965 | Brandt | 74/87 |
| 3,404,854 | 10/1968 | Di Bella | 244/62 |
| 3,505,886 | 4/1970 | Hill et al. | 74/61 |
| 3,810,394 | 5/1974 | Novak | 74/87 |
| 3,875,811 | 4/1975 | Fuller | 74/61 |
| 3,998,107 | 12/1976 | Cuff | 74/84 S |
| 4,050,527 | 9/1977 | Lebelle | 74/61 X |
| 4,084,445 | 4/1978 | Erwin | 74/61 |
| 4,152,943 | 5/1979 | Wall | 74/87 |
| 4,262,549 | 4/1981 | Schwellenbach | 74/87 |
| 4,280,368 | 7/1981 | Woltering | 74/61 |
| 4,561,319 | 12/1985 | Lilja | 74/87 X |
| 4,577,995 | 3/1986 | Sadahiro | 74/87 X |

FOREIGN PATENT DOCUMENTS

| | | | |
|---|---|---|---|
| 641570 | of 0000 | Fed. Rep. of Germany | 209/367 X |
| 2341245 | 5/1975 | Fed. Rep. of Germany | 74/84 S |
| 252357 | 3/1927 | Italy | 74/61 |

OTHER PUBLICATIONS

Burton, Ralph, Vibration and Impact, Addison-Wesley, Reading, MA 1958, pp. 88-95.
Machover, Carl, Basis of Gyroscopes, vol. 1, John F. Rider Pub. New York, NY 1963, pp. 12-25.

Primary Examiner—Allan D. Herrmann
Assistant Examiner—Julie Krolikowski
Attorney, Agent, or Firm—William S. Ramsey

[57] ABSTRACT

A motivational generator which provides vibratory motions for screens, shakers, and vehicles which utilize such motions is described. In one embodiment rotatory motion is imparted to a spinning frame which transmits the motion to two unbalanced chevron-shaped vibratory devices via gears, belts, and pulleys. In another embodiment, the motion of the spinning frame is conveyed to unbalanced chevron-shaped vibratory devices directly through gears. In a third embodiment, the unbalanced chevron-shaped vibratory devices are rotated without rotation of the spinning frame. In the first two embodiments, the spinning frame imparts a gyroscopic effect which stabilizes the motivational generator against vibration in all directions other than the desired back-and-forth direction along the spin axis.

11 Claims, 4 Drawing Sheets

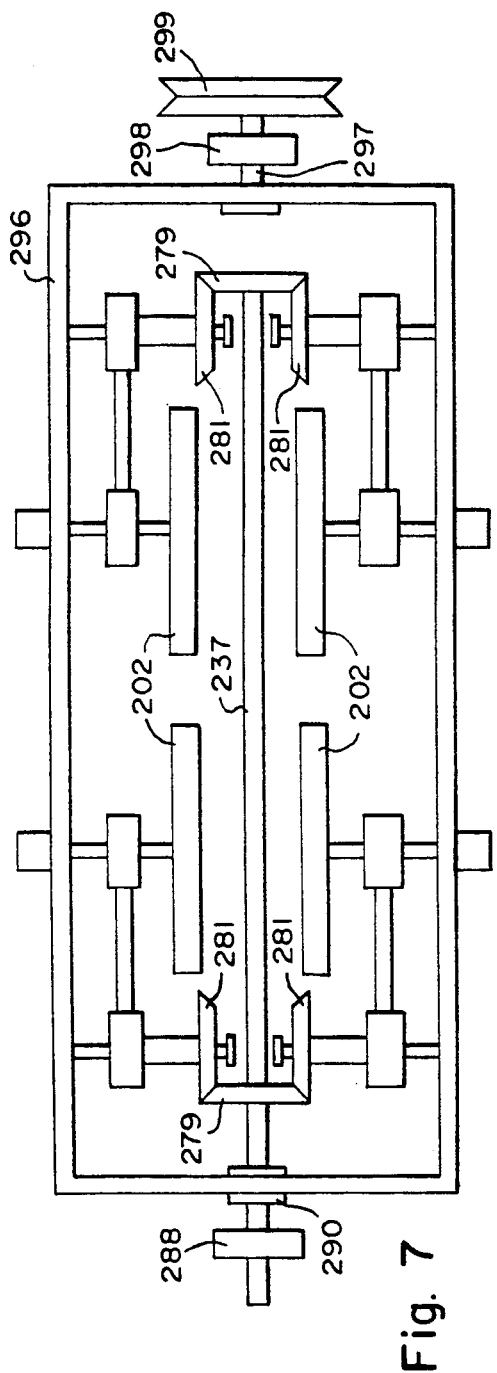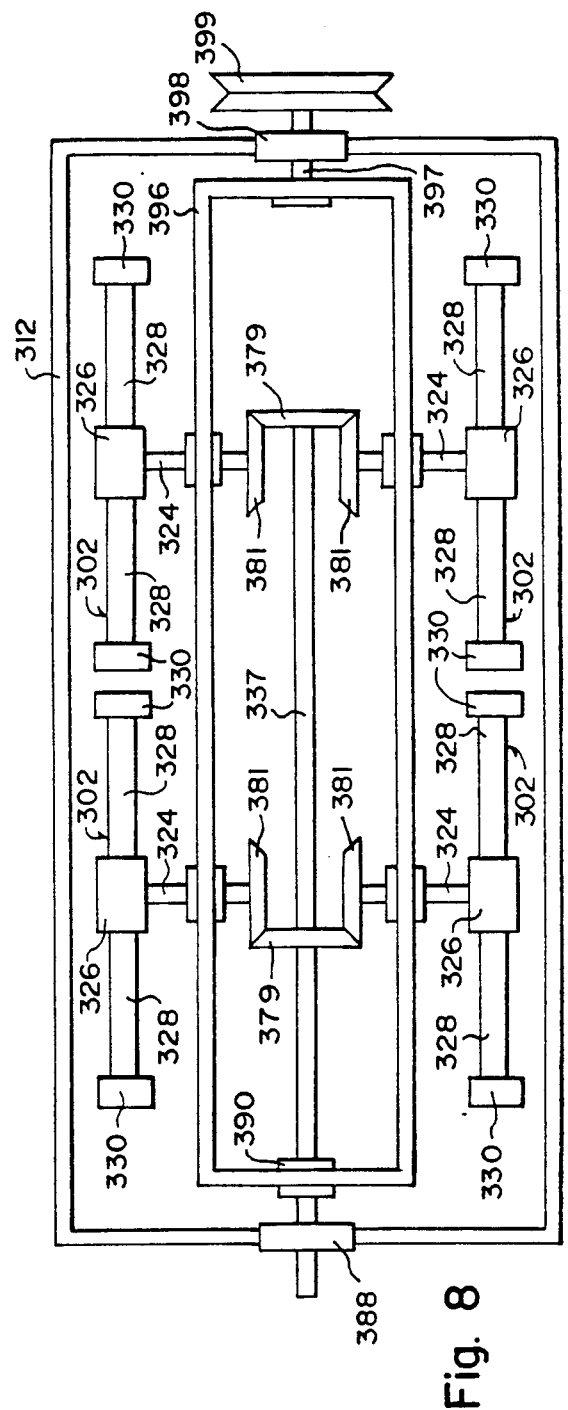
Fig. 7
Fig. 8

MOTIVATIONAL GENERATOR

BACKGROUND OF THE INVENTION

1. Field of the Invention

This invention relates to mechanical movements for converting rotary motion to gyratory motion in which the motion is changed by means of unbalanced weights and in which the motion is changed by means of inertia or centrifugal means.

2. Description of the Related Art

A number of patents on inventions using unbalanced weights to impart vibratory motions appear in the U.S. Patent records. U.S. Pat. No. 2,730,237 discloses a vibrator for screens which uses an unbalanced weight on each end of a rotary shaft. U.S. Pat. No. 3,404,854 describes an apparatus with a rotating frame which has a bore through which a rotary shaft bearing a weight passes. U.S. Pat. No. 3,505,886 describes a hammering vibrator in which the weight is driven by an eccentrically located crank through a lever. U.S. Pat. No. 3,810,394 describes a centrifugal mechanical device in which an off center of rotation axis shaft with crank arms is used to vary the distance of rotating masses from the off center of rotation axis shaft. U.S. Pat. No. 3,998,107 describes the use of a crank-like shaft to vary the radius of gyration of multiple gyrating masses. U.S. Pat. No. 3,220,268 describes a vibration generator with eccentric masses which rotate in parallel planes and which may rotate at different speeds. U.S. Pat. No. 4,289,369 discloses a vibratory force producer in which multiple plates bearing unbalanced weights rotate in a single plane.

SUMMARY OF THE INVENTION

The motivational generator of this invention combines gyroscope-like rotating axially-balanced mass with a vibratory force generator comprised of two unbalanced rotating devices. The rotating gyroscope-like mass damps vibrations in the plane perpendicular to the rotating axis. The vibratory force generator provides strong vibratory motions in the plane parallel to the rotating mass. Thus the combined effect is to provide defined back and forth vibratory motions in a single plane while inhibiting vibratory motions of the device in all other planes.

The vibratory devices of this invention may be regarded formally as one unbalanced flywheel on a shaft which is synchronized to another unbalanced flywheel on a shaft (Vibration and Impact R. Burton, Addison-Wesley Pub. Co. Inc., Reading, Mass., 1958, pages 89-92). Periodic forces which result in vibration in such a device result from the displacement of the center of mass of the flywheel from the axis of rotation, which is located in the center of the rotating shaft.

The displacement of the center of mass from the axis of rotation is called the eccentricity and is given the symbol e. When m is the mass of the flywheel, o is the angular velocity, and F is the force generated, the following relation holds:

$$F = meo^2$$

The spinning of the axially-balanced spinning rectangular frame about the spin axis defined by the axles which connect the spinning rectangular frame to the base provides a gyroscope effect. This provides stability to the motivational generator in all directions other than back and forth motions in the direction of the spin axis. Angular momentum is essentially the property of a gyroscope which determines its tendency to stay fixed in space. If H is angular momentum, I is inertia, and W is spin velocity, then $$H = IW.$$

(Basis of Gyroscopes, C. Machover, Vol. 1, John F. Rider Publications, NY 1963, pages 12-25.)

It is accordingly an object of the present invention to provide an improved motivational generator to provide vibratory motions to assist in sieving, tamping, and settling of aggregate materials and to motivate vehicles of the sort which are propelled by vibratory forces.

Another object of this invention is to provide a motivational generator which allows efficient conversion of energy by avoiding lost motion.

Another object of this invention is to provide a motivational generator in which the vibratory forces generated are expressed by vibratory motion in one plane only.

Another object of this invention is to provide a motivational generator which is stabilized by a gyroscopic effect.

Another object of this invention is to provide a motivational generator in which the vibratory force may be varied.

Another object of this invention is to provide a motivational generator with a gentle, evenly distributed vibratory motion.

Another object of this invention is to provide a motivational generator which may be operated with the spinning rectangular frame fixed in a non-spinning configuration.

Another object of this invention is to provide a motivational generator with a definitely defined back and forth motion.

Another object of this invention is to provide a motivational generator which is reliable, economical in operation, and may be manufactured at low cost.

Other objects of this invention will in part be obvious and in part appear hereinafter.

BRIEF DESCRIPTION OF THE DRAWINGS

FIG. 7 is a diagrammatical top plan view of the motivational generator embodiment four.

FIG. 8 is a diagrammatical top plan view of the motivational generator embodiment five.

DESCRIPTION OF THE PREFERRED EMBODIMENTS

Figure 1:
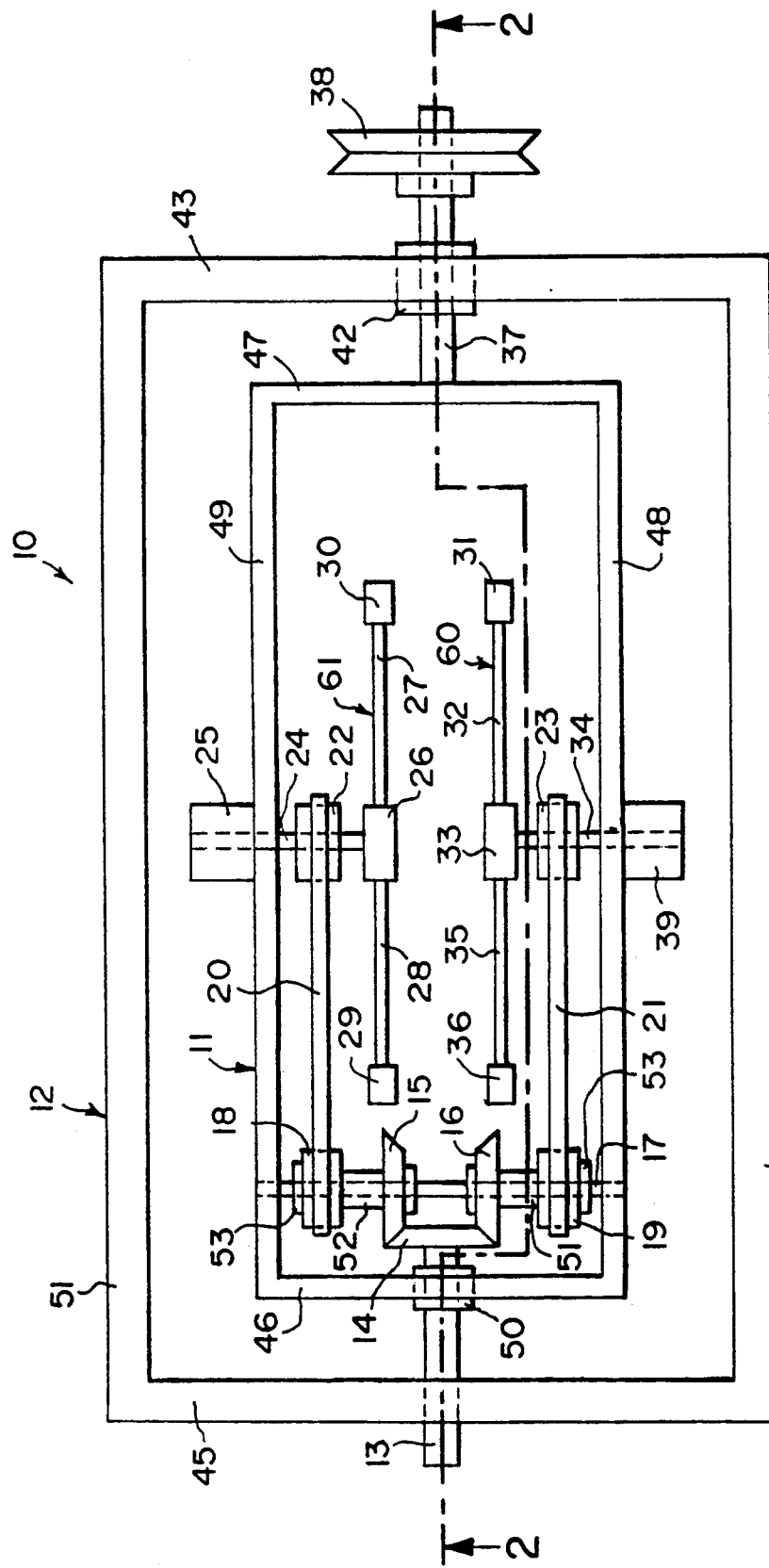
FIG. 1 is a diagrammatical top plan view of the motivational generator embodiment one.

FIG. 1 shows the first embodiment motivational generator 10. It may be mounted on a shaker, sieve, soil compactor, or vehicle which is moved by the action of vibratory forces (not shown). The motivational generator may be regarded as a spinning rectangular frame 11 mounted in a stationary frame or base 12. The spinning rectangular frame 11 contains the unbalanced weights, vibratory devices or chevron-shaped eccentric weights units 60, 61 which convert the spinning motion into vibratory motion.

The stationary frame or base 12 consists of sides 44 and 51 and ends 43 and 45. End 43 contains a journal bearing 42 through which is rotatively mounted axle 37. One end of axle 37 is fixedly mounted on end 47 of the spinning rectangular frame 11. The other end of axle 37 extends outside the stationary frame 12 and pulley or sheave 38 is fixedly mounted on it. The pulley 38 is rotated by a belt connected to a power source (not shown). A first end of axle 13 is fixedly mounted on end 45 of the stationary frame 12 and extends inside the stationary frame. Axle 13 is mounted coaxial with axle 37. Axle 13 is rotatively mounted in a journal bearing 50 in the end 46 of the spinning rectangular frame 11 and the second end of axle 13 extends into the interior of the spinning rectangular frame.

The spinning rectangular frame 11 consists of sides 48 and 49 and ends 46 and 47, forming an enclosure with an inside and an outside. In embodiment one, the chevron-shaped eccentric weights units are mounted on the inside of frame 11. One end of axle 37 is fixedly mounted on end 47. A journal bearing 50 mounted on end 46 receives axle 13. A first miter or bevel gear 14 is fixedly mounted on the end of axle 13 which extends to the interior of the spinning frame. An axle 17 is fixedly mounted between sides 48 and 49 of the spinning rectangular frame. A sleeve or bushing 51 is rotatively mounted on bearings on axle 17. Third miter gear 16 and pulley 19 are fixedly mounted on the sleeve 51. Third miter gear 16 meshes with first miter gear 14, which is fixedly mounted on the fixed axle 13. Rotation of the spinning rectangular frame causes rotation of or drives the third miter gear 16, sleeve 51, and pulley 19. Similarly, sleeve 52 is rotatively mounted on bearings on axle 17. Second miter gear 15 and pulley 18 are fixedly mounted on sleeve 52. Second miter gear 15 meshes with first miter gear 14, which is fixedly mounted on the fixed axle 13. Rotation of the spinning rectangular frame causes rotation of or drives the second miter gear 15, sleeve 52, and pulley 18. The meshing of second miter gear 15 and third miter gear 16 with first miter gear 14 is insured by stops or rings 53 which prevent translational movement of sleeves 51 and 52 on axle 17.

A journal bearing 39 is mounted on side 48 of the spinning rectangular frame 11. An axle 34 extends through side 48 and is rotatively mounted in bearing 39. Pulley 23 is fixedly mounted on axle 34. A positive drive, chain or timing belt 21 connects pulley 23 with pulley 19. A hub or disk 33 is attached to the innermost end of axle 34. Hub 33 has slots in the circumference which receive arms 32 and 35, which are secured with bolts or other suitable attachment means. Arms 32 and 35 are equal in length, are mounted parallel to side 48, and rotate about axle 34 in a plane of rotation parallel to side 48. The angle between arms 32 and 35 in the plane of rotation is 140°. This angle may be varied from 90° to 170° by installing a hub having appropriate slots which receive the arms. Identical weights 31 and 36 are connected to the ends of arms 32 and 35, respectively. An axle 24 extends through side 49 and is rotatively mounted in bearing 25. Pulley 22 is fixedly mounted on axle 24. A positive drive, chain or timing belt 20 connects pulley 18 and pulley 22. A hub or disk 26 is attached to the innermost end of axle 34. Hub 26 has slots in the circumference which receive arms 27 and 28, which are secured by bolts or other suitable attachment means. Arms 27 and 28 are equal in length, are mounted parallel to side 49, and rotate about axle 24 in a plane of rotation parallel to side 49. The angle between arms 27 and 28 is 140°. This angle may be varied from 90° to 170° by installing a hub having appropriate slots for the arms. Identical weights 29 and 30 are connected to the ends of arms 28 and 27, respectively.

The subassembly of axle 34, hub 33, arms 32 and 35, and weights 31 and 36 is called a chevron-shaped eccentric weights unit 60 or unbalanced weights device. Similarly, the subassembly of axle 24, hub 26, arms 27 and 28, and weights 29 and 30 is called a chevron-shaped eccentric weights unit 61 or unbalanced weights device.

Pulleys 19, and 23 are equipped with gear teeth on the circumference surfaces which contact belt 21. Such teeth mesh with corresponding teeth on the innermost surface of belt 21. Similarly, pulleys 18 and 22 have teeth which mesh with teeth on belt 20. Thus there is provided a positive and slip-proof driver relationship between pulleys 18 and 22 and between pulleys 19 and 23, respectively.

Figure 2:
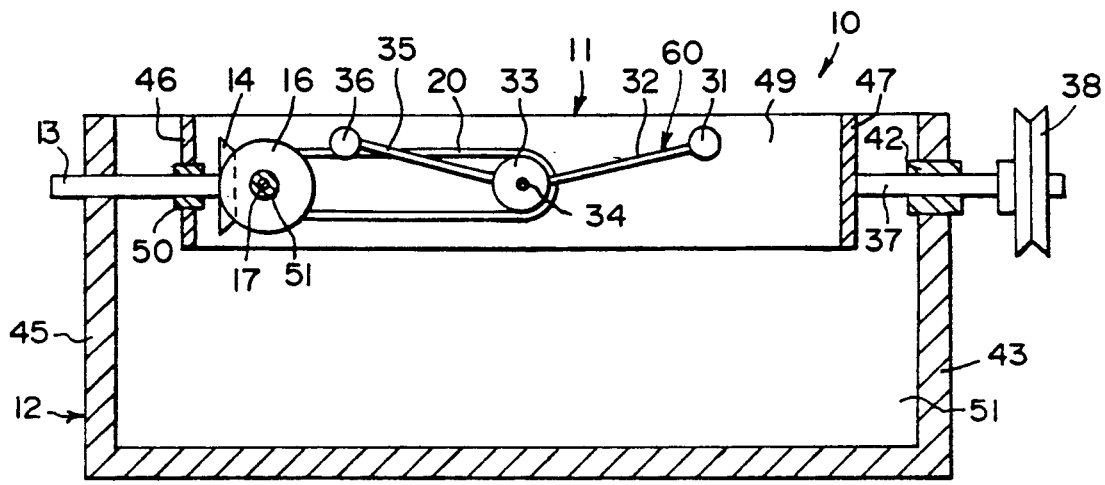
FIG. 2 is a diagrammatical side view of the motivational generator embodiment one taken along line 2—2 of FIG. 1.

FIG. 2 is a diagrammatical view of embodiment one along line 2—2 of FIG. 1 showing frame 12, and fixed axle 37 and rotatively mounted axle 13 which support spinning rectangular frame 11. First miter gear 14 fixedly mounted on one end of axle 13 meshes with third miter gear 16 which is connected to a pulley (not shown) and a belt (not shown) which rotate axle 34. Hub 33 is attached to axle 34, arms 35 and 32 are attached to hub 33, and weights 31 and 36 are attached to arms 32 and 35 respectively, and constitute the subassembly chevron-shaped eccentric weights unit 60.

The motivational generator embodiment one is operated by rotation of axle 37, which causes rotation of the spinning rectangular frame 11 and the relative movement of gears 15 and 16 which mesh with the stationary gear 14. The movement of gear 16 is translated in a positive, synchronized fashion to the rotation of the chevron-shaped eccentric weights unit 60 via sleeve 51, pulley 19, belt 21 and pulley 19. Similarly, rotation of gear 15 is translated in a positive, synchronized fashion to rotation of the chevron-shaped eccentric weights unit 61 via sleeve 52, pulley 18, belt 20 and pulley 22. Thus rotation of axle 37 results in both rotation of the spinning rectangular frame 11 and synchronized rotation of chevron-shaped eccentric weights units 60 and 61.

Figure 3:
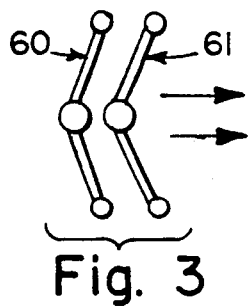
FIG. 3 is a diagrammatical view of the chevron shaped eccentric weight devices of embodiment one when aligned.
Figure 4:
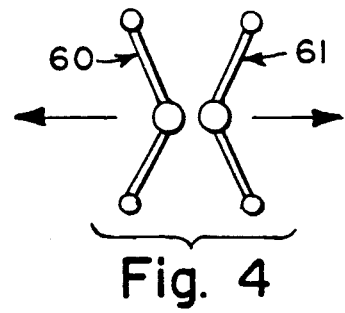
FIG. 4 is a diagrammatical view of the chevron shaped eccentric weight devices of embodiment one when opposed.

Chevron-shaped eccentric weights units 60 and 61 rotate in opposite directions, one clockwise and the other counterclockwise. At two points in every revolution, the weights of one chevron-shaped eccentric weights unit are aligned. In the aligned configuration, the weights of one unit are as close as possible to the weights of the other unit. FIG. 3 is a diagrammatical view of the devices in the aligned configuration. The devices are said to be opposed when at two other points of the rotatory cycle the weights of one unit are at the maximum distance from the weights of the other unit. FIG. 4 is a diagrammatical view of the devices in the opposed configuration. The maximum force is generated in the aligned configuration and the minimum force is generated in the opposed configuration. Thus every revolution of the chevron-shaped vibratory devices is characterized by two repetitions of a maximum vibratory force followed by a minimum vibratory force. Every quarter turn of each chevron-shaped eccentric weights unit engenders either a maximum or minimum force. This alteration of forces causes the generation of vibration by the motivational generator.

Figure 5:
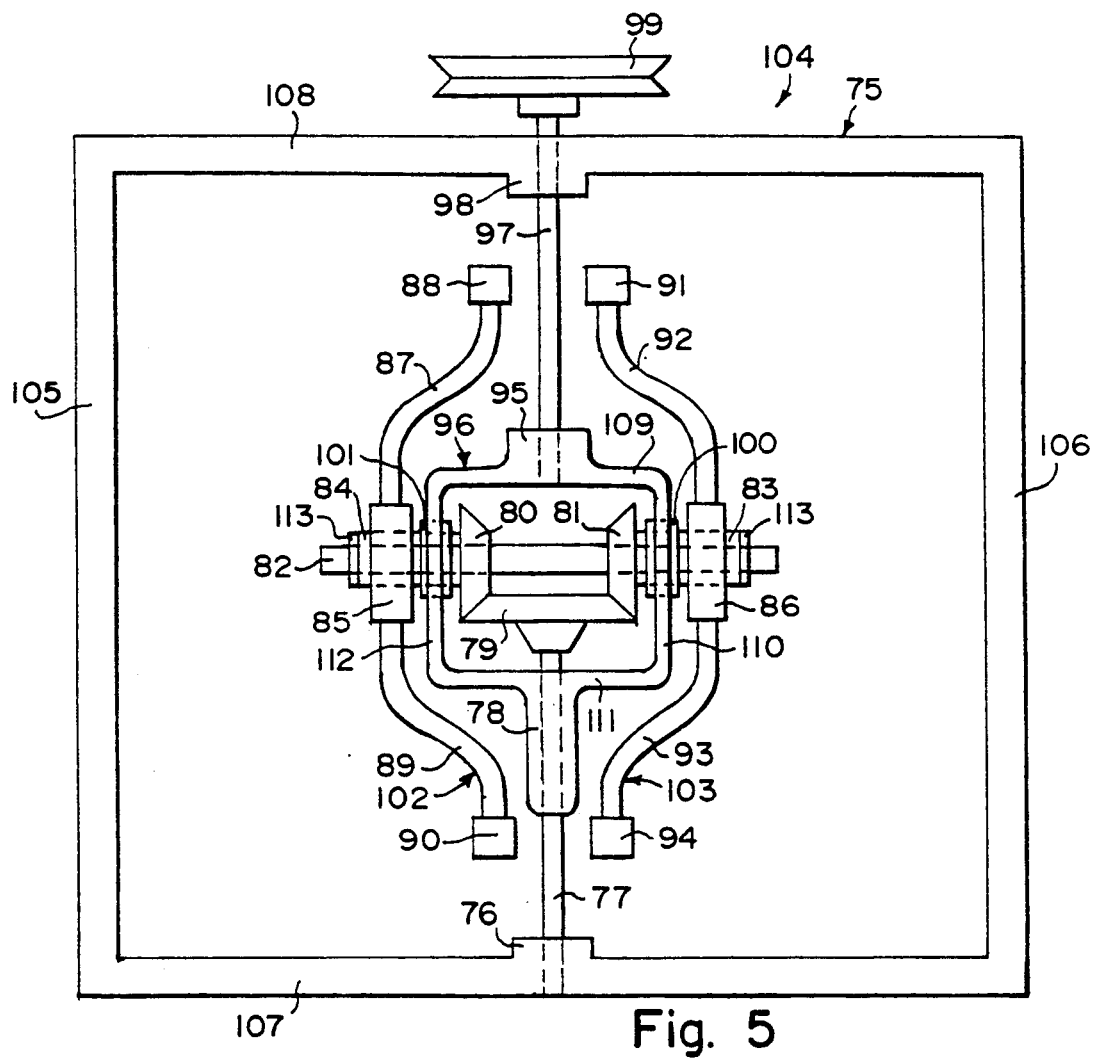
FIG. 5 is a diagrammatical top plan view of the motivational generator embodiment two.

A second embodiment of the motivational generator is shown in FIG. 5., 104. The second embodiment is mounted on a shaker, sifter, vehicle, etc. as is the first embodiment. The second embodiment may be regarded as a spinning rectangular frame 96 mounted in a stationary frame or base 75. Attached to the outside of the spinning rectangular frame 96 are two chevron-shaped eccentric weights units 102, 103 which convert the spinning motion into vibratory motion.

The stationary frame or base 75 consists of sides 105, 106 and ends 107, 108. End 108 contains a journal bearing 98 through which is rotatively mounted axle 97. One end of axle 97 is fixedly mounted on end 109 of the spinning rectangular frame 96. The other end of axle 97 extends outside the stationary frame 75 and pulley or sheave 99 is fixedly mounted on it. Pulley 99 is rotated by a belt connected to a power source (not shown). A first end of axle 77 is fixedly mounted on end 107 of the stationary frame 75 at support member 76 and extends inside the stationary frame. Axle 77 is mounted coaxial with axle 97. Axle 77 is rotatively mounted in a journal bearing 78 in the end 111 of the spinning rectangular frame 96 and the second end of axle 77 extends into the interior of the spinning rectangular frame.

The spinning rectangular frame 96 consists of sides 110 and 112, and ends 109 and 111 which form an enclosure having an inside and an outside. In the second embodiment, the chevron-shaped eccentric weights units are mounted on the outside of frame 96. One end of axle 97 is fixedly mounted on end 109. A journal bearing 78 mounted on end 111 receives axle 77. A first miter or bevel gear 79 is fixedly mounted on the end of axle 77 which extends to the interior of the spinning frame. An axle 82 is fixedly mounted between sides 110 and 112 of the spinning rectangular frame. A sleeve or bushing 83 is rotatively mounted on bearings on axle 82. Second miter gear 81 is fixedly mounted on a first end of sleeve 83. Second miter gear 81 meshes with first miter gear 79, which is fixedly mounted on the fixed axle 77. Rotation of the spinning rectangular frame causes rotation of second miter gear 81, and sleeve 83. Similarly, sleeve 84 is rotatively mounted on bearings on axle 82. Third miter gear 80 is fixedly mounted on a first end of sleeve 84. Third miter gear 80 meshes with first miter gear 79, which is fixedly mounted on the fixed axle 77. Rotation or the spinning rectangular frame causes rotation of third miter gear 80 and sleeve 84. The meshing of second and third miter gears 81 and 80 with first miter gear 79 is insured by stops or rings 113 which prevent translational movement of sleeves 83 and 84 on axle 82.

A journal bearing 100 is mounted on side 110 of the spinning rectangular frame 96. Axle 82 and sleeve 83 extend through side 110 and sleeve 83 is rotatively mounted in bearing 100. A hub or disk 86 is attached to a second end of sleeve 83. Hub 86 has slots in the circumference which receive arms 92 and 93, which are secured with bolts or other suitable attachment means. Arms 92 and 93 are equal in lengths, and may be curved (as in this second embodiment) or straight. Arms 92 and 93 rotate about axle 82 in a plane of rotation generally parallel to side 110. The angle between arms 32 and 35 in the plane of rotation is 140°. This angle may be varied from 90° to 170° by installing a hub having appropriately spaced slots which receive the arms. Identical weights 91 and 94 are attached to the ends of arms 92 and 93, respectively. Similarly, hub 85 is attached to the second end of sleeve 84. Hub 85 has slots in the circumference which receive arms 87 and 89, which are secured by bolts or other suitable attachment means. Arms 87 and 89 are equal in length and may be curved (as in this second embodiment) or straight. Arms 87 and 89 rotate about axle 82 in a plane of rotation generally parallel to side 112. The angle between arms 87 and 89 in the plane of rotation is 140°. This angle may be varied from 90° to 170° by installing a hub having appropriately spaced slots which receive the arms. Identical weights 88 and 90 are connected to the ends of arms 87 and 89, respectively.

The subassembly of sleeve 83, hub 86, arms 92 and 93, and weights 91 and 94 is called a chevron-shaped eccentric weights unit 103. Similarly, the subassemble of sleeve 84, hub 85, arms 87 and 89, and weights 88 and 90 is called a chevron-shaped eccentric weights unit 102.

The motivational generator second embodiment is operated by rotation of axle 97, which causes rotation of the spinning rectangular frame 96 and the relative movement of gears 80 and 81 which mesh with stationary gear 79. The movement of gear 81 is translated in a positive synchronized fashion to the rotation of the chevron-shaped eccentric weights unit 103. Similarly, rotation of gear 80 is translated in a positive, synchronized fashion to rotation of the chevron-shaped eccentric weights unit 102. Thus rotation of axle 97 results in both rotation of the spinning rectangular frame 96 and synchronized rotation of chevron-shaped eccentric weights units 102 and 103.

The synchronization of rotation of the chevron-shaped eccentric weights units assures that the mass of the spinning rectangular frame is symmetrically distributed at all times about the spinning axis 62 defined by axles 13 and 34. This allows the spinning rectangular frame to behave as a gyroscope with dampening and inhibition of lateral movements of the spinning axis about axis 62.

Figure 6:
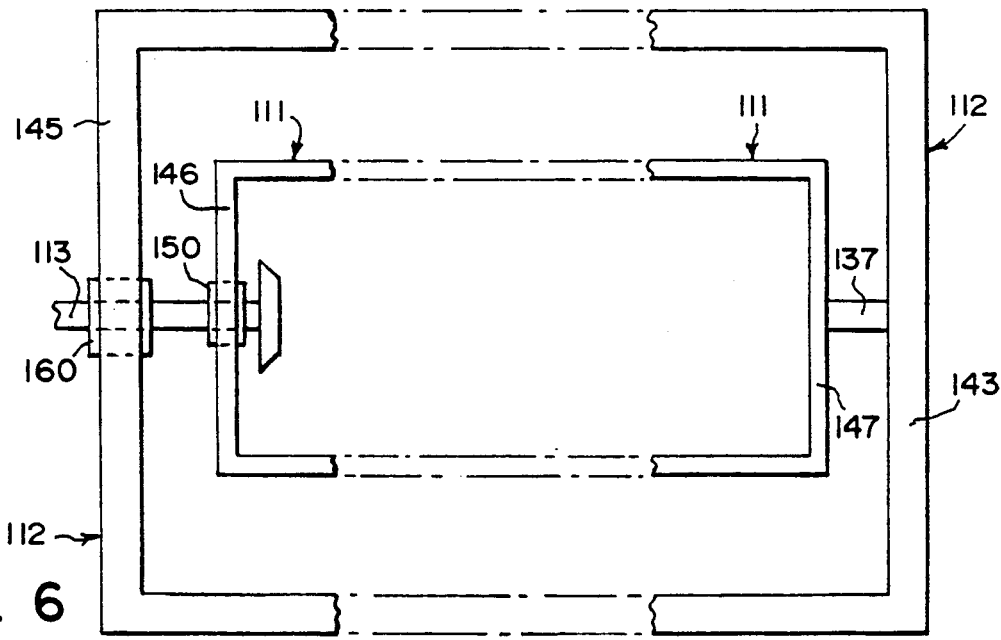
FIG. 6 is a diagrammatical top plan view of the motivational generator embodiment three.

A third embodiment motivational generator is shown in FIG. 6. Embodiment three is the same as embodiment one except for the method of mounting of the rectangular frame and the application of power to the motivational generator. In this embodiment the rectangular frame 111 is fixedly mounted to the stationary frame or base 112 by axle 137 which is rigidly mounted to both end 147 of frame 111 and to end 143 of frame 112. Axle 113 passes through a journal bearing 160 mounted in end 145 of frame 112. Axle 113 passes through a journal bearing mounted in end 146 of frame 111.

Embodiment three is operated by rotation of axle 113, which causes subsequent rotation of the gears, pulleys, and chevron-shaped eccentric weights units as in embodiment one. The rectangular frame on which the chevron-shaped eccentric weights units are mounted does not spin in embodiment three.

A fourth embodiment motivational generator is shown in FIG. 7. Embodiment four may be regarded as a modification of embodiment one having four rather than two chevron-shaped eccentric weights units. In embodiment four, a spinning rectangular frame 296 is mounted in a stationary frame (not shown) which is mounted on the object to be shaken. An axle 297 is fixedly mounted to the frame 296 and passes through a journal bearing 298 on the stationary frame. A pulley 299 is attached to one end of axle 297 and is connected to a power source (not shown). An axle 237 is fixedly mounted to the stationary frame at mounting 288 and passes through a journal bearing 290 in the spinning frame 296. Two miter gears 279 are mounted on axle 237 and mesh with miter gears 281. The rotation of the spinning rectangular frame 296 causes rotation of miter gears 281 about gears 279 and rotation of gears 281 about their own axes. Rotation of gears 281 causes rotation of pulleys and belts which rotate the four chevron-shaped eccentric weights units 202.

The motivational generator embodiment four is operated by rotation of axle 297, which causes rotation of the spinning rectangular frame 296 and the relative movement of gears 279 and 281. This is translated as in embodiment one to the rotation of the four chevron-shaped eccentric weights units 202. Thus rotation of axle 297 results in both rotation of the spinning rectangular frame 296 and synchronized rotation of chevron-shaped eccentric weights units 202.

A fifth embodiment motivational generator is shown in FIG. 8. Embodiment five may be regarded as a modification of embodiment two having four rather than two chevron-shaped eccentric weights units. In embodiment five, a spinning rectangular frame 396 is mounted in a stationary frame or base 312 which is mounted on the object to be shaken. An axle 397 is fixedly mounted to the frame 396 and passes through a journal bearing 398 on the stationary frame. A pulley 399 is attached to one end of axle 397 and is connected to a power source (not shown). An axle 337 is fixedly mounted to the stationary frame at mounting 388 and passes through a journal bearing 390 on the spinning frame 396. Two miter gears 379 are mounted on axle 337 and mesh with the four miter gears 381. Rotation of spinning rectangular frame 396 causes rotation of miter gears 381 about miter gears 379, causing rotation of gears 381 about their own axes. Rotation of gears 381 causes rotation of axles which support and rotate the four chevron-shaped eccentric weights units 302. Each unit comprises an axle 324, a hub 326, two arms 328, and two weights 330.

The motivational generator embodiment five is operated by rotation of axle 397, which causes rotation of the spinning rectangular frame 396 and the relative movement of gears 379 and 381. The rotation of gears 381 is translated as in embodiment two to the rotation of the four chevron-shaped eccentric weights units 302. Thus rotation of axle 397 results in both rotation of the spinning rectangular frame 396 and synchronized rotation of chevron-shaped eccentric weights units 302.

Thus there has been shown and described novel motivational generators for shaking applications which fulfill all the objects and advantages sought therefor. Many changes, modifications, variations and other uses and applications of the subject invention will, however, become apparent to those skilled in the art after considering this specification and accompanying drawings. All such changes, modifications, variations, and other uses and applications of the present invention which do not depart from the spirit and scope of the invention are deemed to be covered by the invention which is limited only by the claims which follow.

I claim:

1. A motivational generator comprising a base, a rectangular frame having an inside and an outside fixedly mounted on the base, two unbalanced weights vibratory devices mounted on the rectangular frame, and means to rotate the unbalanced weights vibratory devices in synchrony wherein the means to rotate the unbalanced weights devices in synchrony comprise:
    an axle rotatively mounted through the rectangular frame, a first miter gear mounted on the axle on the inside of the rectangular frame,
    driven second and third miter gears rotatively mounted inside the rectangular frame which mesh with the first miter gear, and transmission means for transmitting the rotation of the second and third miter gears in synchrony to the unbalanced weights devices, and
    means to rotate the axle.

2. A motivational generator comprising:
    a base,
    a rectangular frame having an inside and an outside rotatively mounted upon the base,
    four unbalanced weights vibratory devices mounted on the rectangular frame,
    means to rotate the unbalanced weights vibratory devices in synchrony, and
    means to rotate the rectangular frame.

3. The motivational generator of claim 2 wherein the unbalanced weights vibratory devices are mounted on the inside of the rectangular frame, and
    the unbalanced weights vibratory devices are chevron-shaped eccentric weights units.

4. The motivational generator of claim 2 wherein the unbalanced weights vibratory devices are mounted on the outside of the rectangular frame, and
    the unbalanced weights vibratory devices are chevron-shaped eccentric weights units.

5. A motivational generator comprising:
    a base,
    a rectangular frame having an inside and an outside rotatively mounted upon the base,
    two unbalanced weights vibratory devices mounted on the rectangular frame,
    each said unbalanced weights vibratory device comprising an axle,
    a hub attached to the axle having attachment means for two arms,
    two arms attached to the hub asymmetrically, and
    a weight attached to each arm,
    forming a chevron-shaped eccentric weights unit,
    means to rotate the unbalanced weights vibratory devices in synchrony, and
    means to rotate the rectangular frame.

6. The motivational generator of claim 5 wherein the unbalanced weights vibratory devices are mounted on the inside of the rectangular frame.

7. The motivational generator of claim 5 wherein the unbalanced weights vibratory devices rotate in synchrony in opposite rotation.

8. A motivational generator comprising:
    a base,
    a rectangular frame having an inside and an outside rotatively mounted upon the base,
    two unbalanced weights vibratory devices mounted on the rectangular frame,
    means to rotate the unbalanced weights vibratory devices in synchrony comprising:

an axle which is fixedly mounted to the base and extends to the inside of the rectangular frame, a first miter gear fixedly mounted on the axle inside the rectangular frame, driven second and third miter gears rotatively mounted inside the rectangular frame which mesh with the first miter gear, and transmission means for transmitting the rotation of the driven second and third miter gears to the unbalanced weight devices, and means to rotate the rectangular frame.

9. The motivational generator of claim 8 wherein the transmission means comprises a sleeve connecting a driven gear to a pulley, a pulley mounted on the unbalanced weights device. and linking means to connect the pulley on the sleeve to the pulley on the unbalanced weights device.

10. The motivational generator of claim 9 wherein the linking means is a belt.

11. The motivational generator of claim 8 wherein the transmission means comprises a sleeve with a driven miter gear mounted on a first end. said sleeve extending from the inside to the outside of the rectangular frame, and an unbalanced weights device mounted on a second end of the sleeve on the outside of the rectangular frame.

* * * * *